Jan. 7, 1941.    L. T. ELIEL ET AL    2,227,575
PUNCH FOR MAP TEMPLETS
Original Filed Feb. 9, 1937
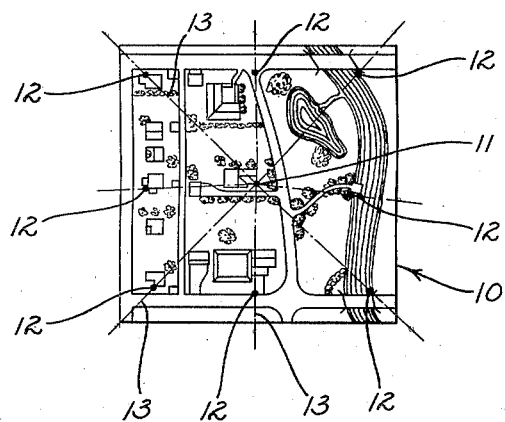
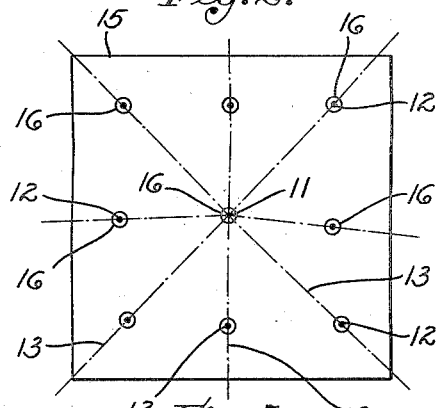
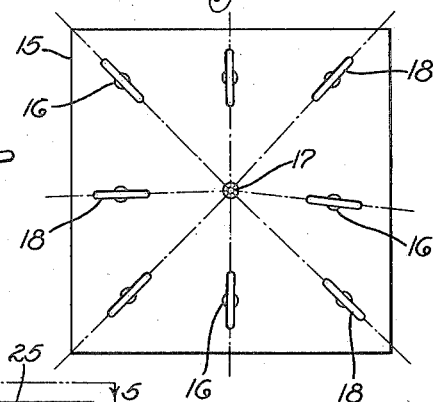
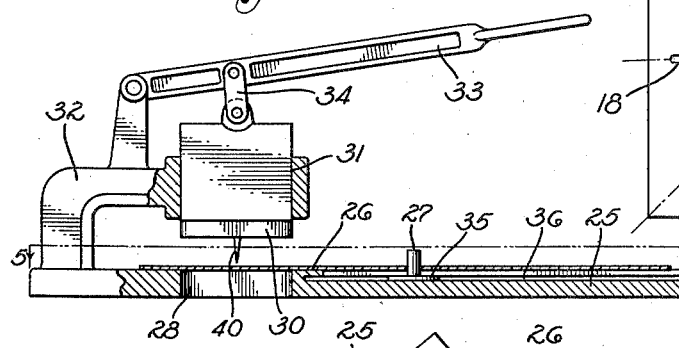
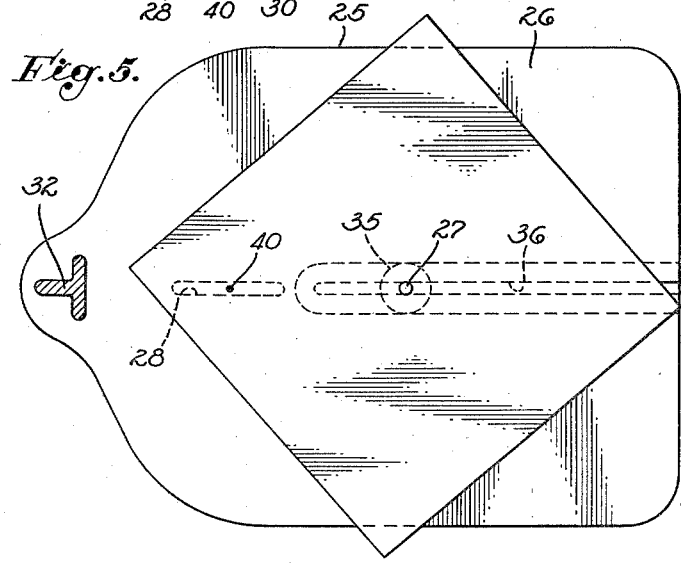
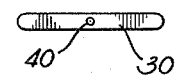
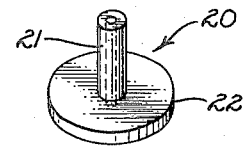
INVENTORS
LEON T. ELIEL
EDWARD R. POLLEY
MAXWELL A. PHILLIPS
BY HARRIS, KIECH, FOSTER & HARRIS
FOR THE FIRM
ATTORNEYS.

Patented Jan. 7, 1941

2,227,575

UNITED STATES PATENT OFFICE 2,227,575

PUNCH FOR MAP TEMPLETS

Leon T. Eliel, Pasadena, and Edward R. Polley and Maxwell A. Phillips, Los Angeles, Calif., assignors to Fairchild, Polley & Eliel, Inc., Los Angeles, Calif., a corporation of California Original application February 9, 1937, Serial No. 124,882. Divided and this application May 15, 1939, Serial No. 273,667

10 Claims. (Cl. 164—86)

Our invention relates to the art of map making with special reference to map methods involving the use of slotted templets, and is directed specifically to the construction of a punch for cutting the slots in such templets.

The present application is a division of our copending application, Serial No. 124,882, filed February 9, 1937, entitled "Method and apparatus for assembling maps."

In the procedure taught by the parent application, templets of cardboard or similar material are placed in overlapping relation on a surface to represent a corresponding series of overlapping photographs taken of the terrain to be mapped. Each of the templets has a central aperture representing the center point of the corresponding photograph and has slots disposed radially thereof representing radial lines through clearly recognizable map points appearing on the photograph. The overlapping templets are interlocked by mechanical means passing through the intersecting slots, the interlocking relationship being such that the positions of said mechanical means as determined by the intersecting slots correspond on the scale of the photographs to the correct positions of the map points they represent. The particular mechanical means for interlocking the templets in the preferred practice of our invention comprise small members in the form of cylindrical posts that are freely slidable in all lateral directions to move with minimum resistance to whatever points are determined by the intersecting slots of the overlapping templets. After the assembly of templets is properly adjusted, the relative locations of the various interlocking posts are plotted on a map sheet for guidance in the subsequent development of either a photographic mosaic or a line map as desired. In our preferred practice the map sheet is stretched over the supporting surface under the map assembly and the interlocking templet posts are recessed to permit plotting their locations on the underlying map sheet without removing or disturbing the templet assembly.

In this art, accuracy is of first importance, and the general object of the present invention is to provide means for making the map templets expeditiously but with mathematical precision.

More specific objects of our invention are directed to meeting the following requisites in cutting templet slots. The first requisite is that the slots be in true radial alignment and absolutely symmetrical with respect to the corresponding radial lines so that the longitudinal axes of the slots will coincide with the imaginary radial lines. The second requisite is that the slots be of uniform width with straight clean-cut edges for mechanical cooperation with the interlocking posts. The third requisite is that the slots be of correct width for tangential contact with the cylindrical posts, the slots being dimensioned to fit the posts sufficiently close to eliminate any appreciable lateral play of the posts with respect to the slots. Of course some tolerance must be provided to permit the posts to slide freely along the slots. In practice we find that dimensioning the slots with not greater than .01 inch clearance relative to the posts will not sacrifice accuracy in our results. In fact such clearance is desirable to allow for slight divergence arising from such factors as camera tilt, and deformation of film or paper. We find also that such clearance normally permits the posts to turn freely, so that by testing the posts for freedom to rotate we may locate places in a templet assembly where inaccuracies are involved. Such clearance is not required in the center holes, however. Another requisite is that each of the slots be of adequate longitudinal extent to permit free shifting of the cooperating post within a substantial range of templet adjustment. Because excessively long slots weaken a templet, the slots, by preference, are of moderate length and approximately centralized with respect to the coresponding map points of the templet. Since the radial distance of the selected map points from the central reference point of the templet varies considerably in practice, it is highly desirable that the templet slotting device be flexible in the sense of readily permitting radial variation in the positioning of the templet slots.

The device of the present disclosure designed with the above considerations in mind is based upon the conception that accurate radial alignment of the slots may be readily achieved if during the slot-cutting process the templet is engaged by means to cause the templet to rotate about the central reference point of the templet as an axis. We propose, then, to provide such templet-engaging means in combination with a slot-cutting means suitably aligned therewith and, by preference, to provide also for relative movement between such templet-engaging means and slot-cutting means whereby the radial distances of the templet slots from the central reference point of templets may be readily varied at will.

One of the specific objects accomplished in the design of the preferred form of our device is the provision of index means for accurately centering the slot cutter with respect to the imaginary radial lines the slots are to represent, and a feature of our construction is that the index means causes the slots to be placed in predetermined longitudinal relationship with the corresponding map points of the templet. In our preferred practice the index means causes the slots to be longitudinally centralized with respect to the map points.

The above and other objects and advantages of our invention will be apparent in the course of our more detailed description to follow taken with the accompanying drawing In the drawing:

Fig. 1 is a view of an aerial photograph taken by an aerial mapping camera;

Fig. 2 shows a map templet in the process of preparation;

Fig. 3 shows the templet after it has been punched and slotted;

Fig. 4 is a partly sectioned elevational view of our templet-slotting device with the templet thereon in position for slotting;

Fig. 5 is a sectional plan view taken as indicated by the line 5—5 of Fig. 4;

Fig. 6 is a bottom plan view of the punch or cutter employed in the device shown in Fig. 4; and Fig. 7 is a perspective view on an enlarged scale of one of the posts employed for interlocking the templets in the map making procedure.

In Fig. 1 we show a typical photograph 10 on which the center point 11 is indicated. A number of selected outlying points that are clearly recognizable are indicated thereon by dots 12 and corresponding lines 13 may be either actually drawn on the photograph or merely imagined as radiating from the center point 11 to the various map points 12.

Fig. 2 shows at an early stage of development a templet 15 representing the photograph 10. The center point 11 and the outlying points 12 have been plotted on the templet by any suitable procedure. For example, we may simply place the photograph over the templet and pierce both the photograph and templet with a needle-like instrument at the selected points. To make the various points conspicuous for the sake of reducing the likelihood of error, we prefer to mark a circle 16 around each of the points. Here again, the lines 13 extending to the points 12 may be either actually drawn on the templets or merely visualized, a feature of our invention being the fact that the necessity for actually plotting or actually locating the lines 13 on either the photographs or templets is entirely avoided.

The next step in the map making procedure is to provide the templet with a central aperture 17 concentric with the point 11 and slots 18 in radial relation thereto passing through the map points 12 on the templet, as indicated in Fig. 3. Both the diameter of the central hole 17 and the width of the various slots 18 are to conform with the posts that are to be subsequently employed for interlocking the templet. Fig. 7 shows a suitable post 20 having a cylindrical stem 21 extending upwardly from a base 22, it being contemplated that the stem 21 will slidingly extend through the templet slots and will be held upright by the base 22. In the preferred practice of our invention the templet of Fig. 2 is first prepared for slotting by cutting the central hole 17 therein and then the cutting of the various slots 18 is accomplished in a rapid manner by the slot-cutting device shown in Fig. 4.

The slot-cutting device includes a base 25 providing a work-support surface 26 and equipped with a suitable pin or post 27 for entering with fairly close fit the aforementioned central reference hole 17 in the templet 15. The slot-cutting means proper includes a die opening 28 in the base 25 and a complementary punch member 30 that is slidingly retained by guide walls 31 and an arm 32 that is mounted on the base to overhand the die opening. The cutting movements of the punch member 30 are governed by an operating handle 33 that is connected to the punch member 30 by a suitable link 34.

Since, as heretofore suggested, it is desirable to provide for varying at will the distance of individual slots from the center point 11, represented by the hole 17, we prefer to provide for relative movement between the slot-cutting means and the post 27. In the particular construction shown in the drawing, we achieve such adjustability simply by mounting the post 27 in a movable manner on the base 25. For example, the post may be provided with a base flange 35 and slidingly mounted in a complementary guide slot 36 having the cross-sectional configuration of an inverted T. It will be noted by an inspection of Fig. 5 that the longitudinal axis of the cutting pattern, in other words the long axis of the die opening 28, or the long axis of the punch member 30 in cross-section, is in radial alignment to the axis of the post 27, and that the longitudinal axis of the guide slot 36 coincides with such radial alignment.

There remains to be described some indexing means whereby the rotational position of the templet may be quickly and accurately determined for the cutting of slots to correspond to given map points appearing on the templet. In the preferred form of our invention the index means consists of a needle-like member 40 extending downwardly from the cutting face of the punch member 30.

The operation of the above described device is readily understood. After the hole 17, representing the central reference point 11, is punched in the plotted templet shown in Fig. 2, the templet is placed on the base 25 of the cutting device with the post 27 extending through the central hole. To cut a slot corresponding to a given map point 16 appearing on the templet, the templet is rotated to bring the particular map point into alignment with the die opening 28, and the templet, together with the post 27, is moved towards or away from the overhanging arm 32 to bring the map point directly under the needle member 40. The operating handle 33 is then lowered a sufficient distance to bring the needle member 40 close to contact with the templet, and any further adjustment is then made to place the needle in precise registry with the map point before the handle is finally swung downwardly to perform the actual slot-cutting operation. The needle, of course, is aligned with the axis of the guide slot 36 and is equidistant from the sides of the punch member 30 to lie on the longitudinal axis of the finished slot, but the needle is not necessarily equidistant from the two ends of the punch member. In other words, the slots cut in the templet are preferably, but not necessarily, longitudinally centralized with respect to the corresponding map points of the templet.

It will be noted as a feature of our invention that since the die opening 28 and the punch member 30 are precisely in radial alignment with the post 27 at all times and since the index means requires only visibility of the various map points 12 of the templet for accurate angular spacing of the slots, the necessity for actually drawing radial lines on the templets is entirely avoided. It is apparent, then, that in addition to providing exceptionally rapid means for accurately slotting the templets, we have succeeded in reducing to a minimum the number of operations required.

Our description in specific detail of a preferred form of our invention will suggest to those skilled in the art various changes, modifications, and substitutions that do not depart from the spirit of our invention, and we reserve the right to all such variations that properly come within the scope of our appended claims. For example, it is not necessary to punch a center hole in a templet for rotatably holding the templet during the slotting operation since the templet may be rotated about a needle point, or the axis of a rotary clamp.

We claim as our invention:

1. A device of the character described for punching slots in a map templet radially symmetrical to a reference center on the templet and including outlying map points on the templet, said device including: means to engage said templet for rotation of the templet about said center; a punch means having an elongated cutting pattern aligned with the center of rotation of the templet at said engaging means; and a pointed projection on the cutting face of said punch means adapted to serve as an index for guidance in the rotational positioning of said templet prior to each slot-punching operation.

2. A device of the character described for punching in a map templet slots that encompass outlying map points and are in radial alignment with a reference center marked by a hole in the templet, said device including: a post dimensioned to fit said hole for holding said templet; a punch having a bladelike cutting member aligned in a plane with the axis of said post, said post being movable toward and away from said punch; and a pointed projection on said cutting member of the punch for contacting the templet at said outlying map points in advance of cutting movements of said member.

3. A device of the character described for punching slots in a map templet radially symmetrical to a reference center on the templet and including outlying map points on the templet, said device including: means to engage said templet for rotation of the templet about said center; a punch member; a die member adapted to cooperate with said punch member, one of said members being movable relative to the other to cut a slot in said templet, said members being aligned with the center of rotation of the templet at said engaging means; and index means carried by the movable one of said members and adapted to overhang said templet for guidance in the rotational positioning of said templet prior to each slot-punching operation.

4. A device of the character described for punching slots in a map templet radially symmetrical to a reference center on the templet and corresponding to outlying map points, said device including: punch means for punching said slots; means to engage said templet for relative rotation of said templet and punch means about said center, said punch means having an elongated cutting pattern aligned with said center, one of said means being movable to vary the radial distance of said punch means from said center; and index means for determining the proper radial and circumferential position of said slots to correspond to said outlying map points.

5. A device of the character described for punching slots in a map templet radially symmetrical to a reference center on the templet and corresponding to outlying map points, said device including: means to engage said templet adjacent said reference center for rotation of the templet about said center; punch means having an elongated cutting pattern aligned with the center of rotation of the templet at said engaging means to punch said slots, one of said means being movable toward and away from the other of said means to vary the radial distance of said slots from said reference center; and index means for determining the proper radial and circumferential position of said slots to correspond to said outlying map points.

6. A device of the character described for punching slots in a map templet in radial alignment with a reference center marked by a hole in the templet, said slots to include outlying points on the templet of various radial distances from said center and to be centralized in width with respect to said outlying points, said device including: a base; means slidingly mounted on said base and adapted to engage said templet by entering said central hole of the templet to enable the templet to be freely rotated about said means as a center and slid along said base by one hand; a punch means mounted on said base having an elongated cutting pattern aligned with the center of rotation of the templet at said engaging means; and means to guide said engaging means along a path that extends radially of the engaging means toward said punch means.

7. A device of the character described for cutting slots in a map templet in radial alignment with a reference center marked by a hole in the templet, said slots to include outlying points on the templet of various radial distances from said center and to be centralized in width with respect to said outlying points, said device including: a base; means mounted on said base adapted to engage said templet by entering said central hole of the templet whereby the templet may be rotated about said hole-entering means as a center; a punch means on said base having an elongated cutting pattern aligned with the center of rotation of the templet at said hole-entering means, one of said means being slidingly mounted on said base; means to guide said slidingly mounted means along a straight path on said base toward the other of said two means; and index means carried by said slot-cutting means for alignment with said outlying points for guidance in both the rotational and radial positioning of said templet prior to each slot-cutting operation.

8. A device of the character described for cutting slots in a map templet in radial alignment with a reference center on the templet, said slots to include outlying points on the templet of various radial distances from said center and to be centralized in width with respect to said outlying points, said device including: a base; means on said base to engage said templet for rotation of the templet about said center; slot-cutting means on said base having an elongated cutting pattern aligned with the center of rotation of the templet at said templet-engaging means, one of said means being slidably mounted on said base; means to guide said slidingly mounted means along a straight path on said base directly toward and away from the other of said two means; and index means positioned to overhang said templet for guidance in positioning of said templet prior to each slot-cutting operation.

9. A device of the character described for cutting slots in a map templet in radial alignment with a reference center marked by a hole in the templet, said slots to include outlying points on the templet of various radial distances from said center and to be centralized in width with respect to said outlying points, said device including: a base; means mounted on said base adapted to engage said templet by entering said central hole of the templet whereby the templet may be rotated about said hole-entering means as a center; a reciprocal slot-cutting means on said base having an elongated cutting pattern aligned with the center of rotation of the templet at said hole-entering means, one of said means being slidingly mounted on said base; means to guide said slidingly mounted means along a straight path on said base directly toward and away from the other of said two means; and index means carried by said reciprocal slot-cutting means for alignment with said outlying map points for guidance in both the rotational and radial positioning of said templet prior to each slot-cutting operation.

10. A device of the character described for cutting slots in a map templet in radial alignment with a reference center marked by a hole in the templet, said slots to include outlying points on the templet of various radial distances from said center and to be centralized in width with respect to said outlying points, said device including: a base; means mounted on said base adapted to engage said templet by entering said central hole of the templet whereby the templet may be rotated about said hole-entering means as a center; a reciprocal slot-cutting means on said base having an elongated cutting pattern aligned with the center of rotation of the templet at said hole-entering means, one of said means being slidingly mounted on said base; means to guide said slidingly mounted means along a straight path on said base toward the other of said two means; and index means projecting from said reciprocal slot-cutting means for contacting the templet in advance of cutting movements of said reciprocal means for guidance in the positioning of said templet prior to each slot-cutting operation.

LEON T. ELIEL.
EDWARD R. POLLEY.
MAXWELL A. PHILLIPS.